United States Patent [19]
Neeb et al.

[11] 3,957,693
[45] May 18, 1976

[54] PROCESS FOR PRODUCING SELENIUM HOMOGENEOUSLY DOPED WITH TELLURIUM

[75] Inventors: Karl Heinz Neeb, Erlangen; Herbert Neidl, Erlangen-Bruck, both of Germany

[73] Assignee: Siemens Aktiengesellschaft, Berlin and Munich, Germany

[22] Filed: Dec. 26, 1972

[21] Appl. No.: 318,438

Related U.S. Application Data

[63] Continuation of Ser. No. 167,475, July 29, 1971, abandoned, which is a continuation of Ser. No. 808,131, March 18, 1969, abandoned.

[30] Foreign Application Priority Data

Mar. 19, 1968  United Kingdom............... 13330/68

[52] U.S. Cl............................ 252/512; 75/134 H; 75/65 R; 252/62.35; 148/1.5
[51] Int. Cl.²....................................... H01L 29/18
[58] Field of Search ............... 252/501, 512, 62.3 S, 252/62.3 R; 23/301 R; 317/241; 148/1.6; 96/1.5; 75/134 H, 65 R

[56] References Cited
UNITED STATES PATENTS

| | | | |
|---|---|---|---|
| 2,745,327 | 5/1956 | Mengali | 96/1.5 |
| 2,912,353 | 11/1959 | Dobrowalski et al. | 252/62.3 X |
| 2,981,687 | 4/1961 | Parmee | 148/1.6 X |
| 3,125,532 | 3/1964 | Keller | 252/62.3 |
| 3,335,084 | 8/1967 | Hall | 148/1.6 X |
| 3,444,438 | 5/1969 | Umblia et al. | 317/241 X |
| 3,477,959 | 11/1969 | Colton | 252/62.3 E |
| 3,723,105 | 3/1973 | Katajima et al. | 75/134 H |
| 3,785,806 | 1/1974 | Henriksson | 75/134 H |

FOREIGN PATENTS OR APPLICATIONS

1,181,614  2/1970  United Kingdom............. 252/62.35

OTHER PUBLICATIONS

Kroczek et al., "Aging of Semiconductor, Namely Selenium Rectifiers", Selenium and Tellurium Abstracts, No. 1324, pp. 741–742, (1963).

Abdullaev et al., "Effect of Oxygen on Some Electrical Properties of Selenium", Selenium and Tellurium Abstracts, No. 3372, pp. 1574–1575 (1966).

*Primary Examiner*—Benjamin R. Padgett
*Assistant Examiner*—R. E. Schafer
*Attorney, Agent, or Firm*—Herbert L. Lerner

[57] ABSTRACT

A process for producing selenium homogeneously doped with a metal. The process comprises mixing the metal with selenium, melting the selenium and mixing the resulting melt in the absence or substantial absence of oxygen or with the extraction of any oxygen or oxide contained in the melt so as to produce selenium homogeneously doped with the metal.

8 Claims, 1 Drawing Figure

U.S. Patent   May 18, 1976   3,957,693
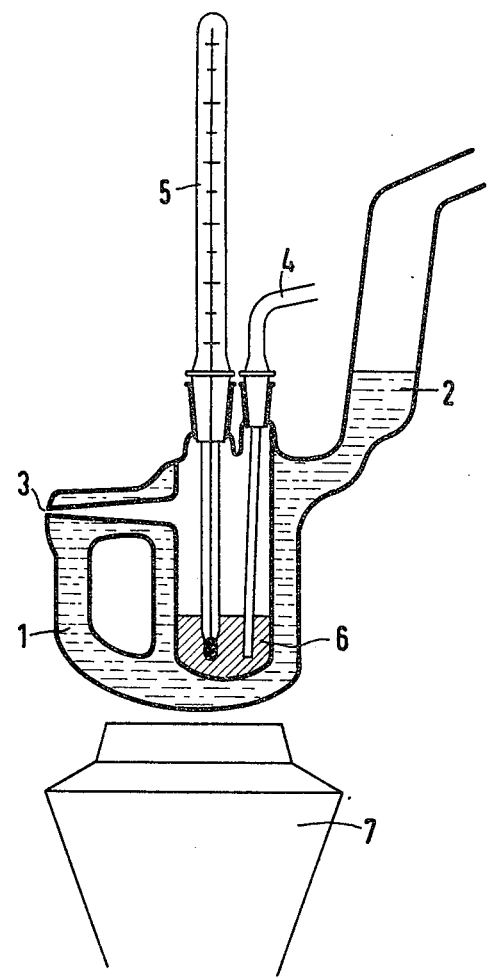

PROCESS FOR PRODUCING SELENIUM HOMOGENEOUSLY DOPED WITH TELLURIUM

This is a continuation, of application Ser. No. 167,475, filed July 29, 1971, now abandoned, which application is a continuation of application Ser. No. 808,131, filed Mar. 18, 1969, now abandoned.

This invention relates to a process for producing selenium homogeneously doped with a metal. The selenium may also contain free halogen atoms and/or a halide of selenium or of the metal.

The doping of selenium with halogen atoms or halogenous compounds is already known. Thus, it is proposed in Swiss Patent No. 225,868, when producing selenium rectifiers, to use selenium which contains at least one non-metallic selenium compound of the formula $Se_2X_2$, in which X represents a halogen. The same patent also discloses that the specific resistance of a selenium layer containing a selenium halide can be further reduced by adding to the selenium, as a further additive, at least one element selected from antimony, bismuth, tin, tellurium, thallium, cerium, iron and arsenic, in an amount from 0.01 to 1%.

Furthermore, it is known that gallium and indium have a similar action in selenium to that of the other metals mentioned above.

The doping with the additional element(s) is in practice almost always effected directly in the melt, the doping substance being mixed in the finest possible divided form with granulated selenium and being finely dispersed throughout the same by stirring during the subsequent melting operation. Page 114 of the dissertation "The influence of doping on the conductivity of polycrystalline selenium and formation of a conductivity model", by H. Eggert and published by Technische Universitat Berlin, 1965, states that a sufficient homogeneity of the distribution is obtained in this way when adding tellurium, because of the good solubility of tellurium in selenium.

However, it has now been found that the doped selenium batches produced in this way possess very different properties and frequently are unsuitable for use in the production of selenium rectifier layers, for example, by vapor coating, and they can cause considerable interruptions in the operation of the rectifiers.

Consequently, it is an object of the present invention to provide a process for the production of selenium homogeneously doped with a metal and optionally containing free halogen atoms and/or a halide of the selenium or of the metal, by admixing the metal with the selenium, melting the selenium and mixing the melt, in which the resulting selenium batches always has reproducible properties, so that the selenium layers produced therefrom have an equally good conductivity throughout the layer and that manufacturing rejects are avoided.

According to the present invention, there is provided a process for producing selenium homogeneously doped with a metal, which comprises mixing the metal with selenium, melting the selenium and mixing the resulting melt in the absence or substantial absence of oxygen or with the extraction of any oxygen or oxide contained in the melt so as to produce selenium homogeneously doped with the metal.

The invention is based on the discovery that, despite the high solubility in selenium of the metal, especially when it is tellurium, the presence of an oxide or oxygen leads to the formation of a metal oxide or selenium oxide whereby a homogeneous distribution of the metal in the selenium is not obtained, and therefore the vapor-coating process necessary for the production of satisfactory selenium layers is disturbed to quite a large extent.

A particularly surprising aspect of the process of this invention is that the inhomogeneities of the metal distribution, caused by the presence of oxygen or of metal oxide, can be nullified without the aid of hydrogen or any other reducing agent. It is assumed that at temperatures above 300°C, preferably above 400°C a reduction of the metal oxide, for example tellurium dioxide, occurs in accordance with the equation:

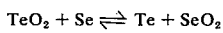

$$TeO_2 + Se \rightleftharpoons Te + SeO_2$$

whereas below this temperature, tellurium is largely oxidized by $SeO_2$ to $TeO_2$. That is, the equilibrium of the indicated reaction is decidedly displaced towards the left.

As can also be shown, a particularly homogeneous metal distribution is obtained if an inert gas, for example argon, is conducted during the heating over or through the reacted materials. This has the effect of continuously removing from the reaction system any selenium oxide which is formed, so that the equilibrium of the reaction indicated above is displaced towards the right and the $TeO_2$ is completely reduced.

The time required for achieving a homogeneous distribution depends both on the quantity of selenium introduced and on the oxide content, as well as on the quantity of gas which is conducted through or passed over the material being reacted. Since the reaction proceeds relatively slowly, it is advisable for the reaction material to be thoroughly stirred. Adequate mixing may be achieved by the introduction on the inert gas with small batches, but it is advisable, with larger batches, to use a mechanical stirrer. It has been found that the optimum temperature range for the homogenization of the tellurium or the reduction of the tellurium dioxide is in the region of 450°C.

As has already been stated, the lack of homogeneity of the metal distribution can also be nullified by the presence of hydrogen at a temperature of from 250°C to 400°C, temperatures from 330°C to 370°C having proved to be particularly advantageous. The metal oxide, e.g. tellurium dioxide, is reduced in this case by hydrogen according to the equation:

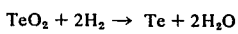

$$TeO_2 + 2H_2 \rightarrow Te + 2H_2O$$

The reaction can be accelerated by conducting the hydrogen over the material, preferably through it, and it is advantageous with relatively large reaction batches to intensify the mixing operation and progress of the reaction by mechanical stirring.

For a better understanding of the invention and to show how the same may be carried into effect, reference will now be made, by way of example, to the accompanying drawing which is a diagrammatic representation of an apparatus suitable for carrying out the process of the invention.

This apparatus comprises a heating bath 1 containing a liquid 2 in which is immersed a reaction vessel 8 with a pouring nozzle 3 and a gas inlet pipe 4. A thermometer 5 is provided for measuring the temperature of a selenium melt 6, and a reflector burner 7 for heating the bath 1.

A quantity of radioactively marked tellurium corresponding to a doping concentration of 100 ppm was added to 30 g selenium.

The resulting mixture was then melted in the apparatus shown in the drawing, while conducting a stream of gas therethrough. To heat the bath, pump oils were used when working up to 350°C and mixtures of $KNO_3$ and $NaNO_3$ were used as heat transfer media during the melting operations up to 450°C.

The reaction material was kept molten for some time and then it was maintained for up to 30 minutes at the pouring or casting temperature of 250°C and was thereafter poured into cold water by tipping the apparatus. The pouring nozzle was of such a dimension that selenium beads with a diameter of from 1 to 2 mm were obtained.

Several selenium batches were obtained in this way, and from 30 to 50 beads were withdrawn from each batch for determining the tellurium content by weighing out the selenium specimens and measuring in each case the γ-activity of the tellurium isotope mixture consisting essentially of $^{121m}Te$, $^{123m}Te$ and $^{125m}Te$, this taking place in a bore-hole scintillation crystal.

For examining the tellurium distribution within an individual selenium bead, several beads from each batch were embedded in Technovit and ground in a suitable manner. The resulting tellurium dispersion is established autoradiographically using exposure times of from 2 to 6 weeks.

The invention will now be illustrated by the following Examples:

EXAMPLE 1

Selenium containing 200 ppm of Cl was doped with 120 ppm of Te in the form of metal fragments in an argon atmosphere. The melt was maintained at 345°C for 30 minutes, and after allowing the reaction material to stand for 30 minutes at 250°C, the reaction material was poured into cold water to produce selenium beads. The mean value of the tellurium content in the selenium beads was 123 ppm (0.0123%) with a standard deviation of ±2.5 ppm; autoradiography showed a completely homogeneous tellurium distribution throughout each of the selenium beads.

EXAMPLE 2

Selenium with 200 ppm of Cl was used as a starting material. The doping was effected with 100 ppm of Te in the form of oxide-free metal powder, in an argon atmosphere. The melt was maintained for 30 minutes at 350°C and then also at 250°C. The mean value of the tellurium content in the selenium beads was 109ppm (0.0109%) with a standard deviation of ±3.0 ppm. As shown by autoradiographic investigations, a completely homogeneous distribution of the tellurium existed throughout each of the selenium beads.

EXAMPLE 3

When the oxide-free tellurium used in the doping processes described in Examples 1 and 2 was replaced by 100 ppm of an initially oxidized tellurium powder, then employing the conditions described in Example 2, there were obtained selenium beads with an extremely non-homogeneous tellurium dispersion. In addition to the selenium beads with a relatively homogeneous basic doping of from 25 to 40 ppm of Te, there were also beads with very high tellurium concentration peaks and values up to 300 ppm of Te were observed. The mean doping value of all of the beads which were investigated was with 35 ppm (0.0035%) of Te, which was only about one third of the total quantity initially employed. Autoradiography showed that beads having 27 ppm (0.0027%) of Te had a homogeneous tellurium distribution, whereas beads having 36 ppm (0.0036%) of Te had a slightly inhomogeneous distribution, while beads having 181 ppm (0.0181%) of Te had a very inhomogeneous distribution.

EXAMPLE 4

The selenium beads produced in Example 3 and having an inhomogeneous tellurium distribution were heated, while passing through hydrogen, for 50 minutes at 350°C and thereafter for 30 minutes at 250°C. Autoradiographic examination showed that the tellurium was present in homogeneous form in the selenium beads after the hydrogen treatment. The mean value of the tellurium content in the selenium beads was 24 ppm (0.0024%) with a standard deviation of ±1.8 ppm.

EXAMPLE 5

The selenium beads obtained in Example 3 and having an inhomogeneous tellurium distribution were heated in a stream of argon for 60 minutes at 450°C and thereafter for 30 minutes at 250°C. The resulting selenium beads which were investigated had a calculated mean tellurium content of 142 ppm (0.0142%) with a standard deviation of ±4.1 ppm. When these beads were examined by autoradiography, they were shown to have a completely homogeneous tellurium distribution.

We claim:

1. In a process for producing selenium homogeneously doped with tellurium involving adding tellurium to the selenium, bringing the mixture of selenium and tellurium to a molten state and cooling the molten mixture to a solidified melt, the improvement which comprises passing a stream of gas selected from the group consisting of an inert gas and hydrogen into and in contact with a body of a molten mixture of selenium and tellurium containing an oxygen compound as an impurity, removing oxygen compound with said gas stream discharging from said body of molten mixture, and continuing the passage of said gas stream into said body of molten mixture for a sufficient length of time to effect removal of the oxygen compound in said molten mixture.

2. A process as in claim 1 wherein said gas is argon.

3. A process as in claim 1 wherein said gas is hydrogen.

4. A process as in claim 1 wherein said molten mixture of selenium and tellurium containing oxygen compound are mechanically stirred.

5. A process as claimed in claim 2 wherein the temperature of the molten mixture of selenium and tellurium containing oxygen compound during the passage of inert gas into the molten mixture is at least 300°C to about 450°C.

6. A process as claimed in claim 3 wherein the temperature of the molten mixture of selenium and tellurium containing oxygen compound during the passage of hydrogen into the molten mixture is from 250°C to 400°C.

7. A process as claimed in claim 6 wherein said temperature range is from 330°C to 370°C.

8. A process as claimed in claim 1 wherein the concentration of tellurium in the selenium is less than 1%.

* * * * *